(12) United States Patent
Kotra et al.

(10) Patent No.: US 12,498,931 B2
(45) Date of Patent: Dec. 16, 2025

(54) PRESERVING MEMORY ORDERING BETWEEN OFFLOADED INSTRUCTIONS AND NON-OFFLOADED INSTRUCTIONS

(71) Applicant: ADVANCED MICRO DEVICES, INC., Santa Clara, CA (US)

(72) Inventors: Jagadish B. Kotra, Austin, TX (US); John Kalamatianos, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 18/298,723

(22) Filed: Apr. 11, 2023

(65) Prior Publication Data

US 2023/0244492 A1 Aug. 3, 2023

Related U.S. Application Data

(63) Continuation of application No. 17/137,140, filed on Dec. 29, 2020, now Pat. No. 11,625,249.

(51) Int. Cl.
*G06F 9/30* (2018.01)
*G06F 9/38* (2018.01)
*G06F 9/52* (2006.01)

(52) U.S. Cl.
CPC .......... *G06F 9/3836* (2013.01); *G06F 9/3001* (2013.01); *G06F 9/3877* (2013.01);
(Continued)

(58) Field of Classification Search
CPC .................................. G06F 9/522; G06F 9/526
See application file for complete search history.

(56) References Cited

U.S. PATENT DOCUMENTS

| 5,903,916 | A | 5/1999 | Pawlowski et al. |
| 6,263,406 | B1 * | 7/2001 | Uwano .................. G06F 9/52 |
| | | | 711/124 |

(Continued)

FOREIGN PATENT DOCUMENTS

| JP | 2009075101 A | 4/2009 |
| WO | 2014120193 A1 | 8/2014 |

(Continued)

OTHER PUBLICATIONS

Nai et al., "GraphPIM: Enabling Instruction-Level PIM Offloading in Graph Computing Frameworks," 2017 IEEE InternationalSymposium on High Performance Computer Architecture (HPCA), Date of Conference: Feb. 4-8, 2017, Austin, TX, DOI: 10.1109/HPCA.2017. 54, Date Added to IEEE Xplore: May 8, 2017, 12 pages.

(Continued)

*Primary Examiner* — Michael J Metzger

(57) ABSTRACT

Preserving memory ordering between offloaded instructions and non-offloaded instructions is disclosed. An offload instruction for an operation to be offloaded is processed and a lock is placed on a memory address associated with the offload instruction. In response to completing a cache operation targeting the memory address, the lock on the memory address is removed. For multithreaded applications, upon determining that a plurality of processor cores have each begun executing a sequence of offload instructions, the execution of non-offload instructions that are younger than any of the offload instructions is restricted. In response to determining that each processor core has completed executing its sequence of offload instructions, the restriction is removed. The remote device may be, for example, a processing-in-memory device or an accelerator coupled to a memory.

20 Claims, 8 Drawing Sheets

(52) U.S. Cl.
CPC .......... *G06F 9/3887* (2013.01); *G06F 9/3888* (2023.08); *G06F 9/522* (2013.01)

(56) References Cited

U.S. PATENT DOCUMENTS

| | | | |
|---|---|---|---|
| 6,553,465 | B1 | 4/2003 | Takusagawa |
| 6,601,153 | B1 | 7/2003 | Engelbrecht et al. |
| 6,944,746 | B2 | 9/2005 | So |
| 6,973,541 | B1 | 12/2005 | Williams et al. |
| 7,047,393 | B2 | 5/2006 | Paver et al. |
| 8,359,462 | B1 | 1/2013 | Khan et al. |
| 9,348,539 | B1 | 5/2016 | Saxena et al. |
| 9,575,815 | B1* | 2/2017 | Guthrie .................. G06F 9/524 |
| 10,061,588 | B2 | 8/2018 | Gschwind et al. |
| 10,282,292 | B2 | 5/2019 | Prodromou et al. |
| 11,043,259 | B2 | 6/2021 | Wentzlaff et al. |
| 11,355,170 | B1 | 6/2022 | Yudanov |
| 11,568,907 | B2 | 1/2023 | Mathew et al. |
| 11,594,274 | B2 | 2/2023 | Murphy |
| 11,663,008 | B2 | 5/2023 | Lee et al. |
| 11,868,777 | B2 | 1/2024 | Kalamatianos et al. |
| 11,921,634 | B2 | 3/2024 | Kotra et al. |
| 2005/0015538 | A1 | 1/2005 | Van't Wout et al. |
| 2005/0246698 | A1 | 11/2005 | Chung |
| 2007/0174685 | A1* | 7/2007 | Banks ................. G06F 11/1658 714/E11.08 |
| 2008/0046692 | A1 | 2/2008 | Michalak et al. |
| 2008/0244185 | A1 | 10/2008 | O'Krafka et al. |
| 2009/0071254 | A1 | 3/2009 | Knowles et al. |
| 2010/0153761 | A1* | 6/2010 | Nishioka ............. G06F 11/3423 713/323 |
| 2011/0242113 | A1* | 10/2011 | Keall .................. G06F 15/7807 345/505 |
| 2012/0159077 | A1 | 6/2012 | Steely, Jr. et al. |
| 2013/0086367 | A1 | 4/2013 | Gschwind et al. |
| 2014/0281405 | A1 | 9/2014 | Streett et al. |
| 2016/0092238 | A1 | 3/2016 | Codrescu et al. |
| 2016/0155491 | A1 | 6/2016 | Roberts et al. |
| 2017/0060588 | A1 | 3/2017 | Choi |
| 2017/0123987 | A1 | 5/2017 | Cheng et al. |
| 2017/0262369 | A1 | 9/2017 | Murphy |
| 2017/0344480 | A1 | 11/2017 | Beard et al. |
| 2018/0089081 | A1 | 3/2018 | Ramalingam |
| 2018/0188961 | A1 | 7/2018 | Venkatesh et al. |
| 2018/0336035 | A1 | 11/2018 | Choi et al. |
| 2019/0138313 | A1 | 5/2019 | Lin |
| 2019/0377580 | A1 | 12/2019 | Vorbach et al. |
| 2020/0035291 | A1 | 1/2020 | Kasibhatla et al. |
| 2020/0174931 | A1 | 6/2020 | Williams et al. |
| 2020/0192757 | A1 | 6/2020 | Qin et al. |
| 2020/0218540 | A1 | 7/2020 | Kesiraju et al. |
| 2020/0294558 | A1 | 9/2020 | Yu et al. |
| 2021/0271680 | A1 | 9/2021 | Lee et al. |
| 2021/0349826 | A1 | 11/2021 | Roy et al. |
| 2022/0076717 | A1 | 3/2022 | Mathew et al. |
| 2022/0156081 | A1 | 5/2022 | Seo et al. |
| 2022/0188117 | A1 | 6/2022 | Kalamatianos et al. |
| 2022/0188233 | A1 | 6/2022 | Kalamatianos et al. |
| 2022/0206817 | A1 | 6/2022 | Kotra et al. |
| 2022/0206855 | A1 | 6/2022 | Challapalle et al. |
| 2022/0237041 | A1 | 7/2022 | Lee et al. |
| 2022/0292033 | A1 | 9/2022 | Yu et al. |
| 2023/0205693 | A1 | 6/2023 | Kotra et al. |
| 2023/0244442 | A1 | 8/2023 | Lee et al. |
| 2023/0244492 | A1 | 8/2023 | Kotra et al. |
| 2023/0393849 | A1 | 12/2023 | Kotra et al. |
| 2024/0126552 | A1 | 4/2024 | Kalamatianos et al. |

FOREIGN PATENT DOCUMENTS

| | | |
|---|---|---|
| WO | 2021028723 A2 | 2/2021 |
| WO | 2022132795 A1 | 6/2022 |
| WO | 2022146793 A1 | 7/2022 |

OTHER PUBLICATIONS

Xu et al., "TUPIM: A Transparent and Universal Processing-in-Memory Architecture for Unmodified Binaries," GLSVLSI '20: Proceedings of the 2020 on Great Lakes Symposium on VLSI, Sep. 7-9, 2020, Virtual Event, China, https://doi.org/10.1145/3386263.3406896, Published: Sep. 7, 2020, 6 pages.

Aga et al., "Co-ML: A Case for Collaborative ML Acceleration using Near-Data Processing", MemSys '19: Proceedings of the International Symposium on Memory Systems, DOI: 10.1145/3357526.3357532, dated Sep. 2019, 12 pages.

Ahn et al., "PIM-Enabled Instructions: A Low-Overhead, Locality-Aware Processing-in-Memory Architecture", 2015 ACM/IEEE 42nd Annual International Symposium on Computer Architecture (ISCA), DOI:10.1145/2749469.2750385, Jun. 2015, 13 pages.

Andi Kleen (andi@firstfloor.org), Memory Offlining, /sys/devices/system/memory/hard_offline_page, URL: https://www.kernel.org/doc/Documentation/ABI/testing/sysfs-memory-page-offline, dated Sep. 2009, 1 page.

Boroumand et al., "LazyPIM: Efficient Support for Cache Coherence in Processing-in-Memory Architectures", IEEE Computer Architecture Letters, vol. 16, Issue 1, DOI:10.1109/LCA.2016.2577557, dated Jun. 2016, 12 pages.

Denby et al., "Orbital Edge Computing: Nanosatellite Constellations as a New Class of Computer System", Proceedings of the Twenty-Fifth International Conference on Architectural Support for Programming Languages and Operating Systems (ASPLOS '20), Mar. 2020, pp. 939-954, IEEE, United States, URL: https://doi.org/10.1145/3373376.3378473.

Farmahini-Farahani et al., "NDA: Near-DRAM Acceleration Architecture Leveraging Commodity DRAM Devices and Standard Memory Modules", 2015 IEEE 21st International Symposium on High Performance Computer Architecture (HPCA), DOI: 10.1109/HPCA.2015.7056040, dated Mar. 2015, 13 pages.

Gao et al., "ComputeDRAM: In-Memory Compute Using Off-the-Shelf DRAMs", Proceedings of the 52nd Annual IEEE/ACM International Symposium on Microarchitecture (MICRO '52), Oct. 2019, pp. 100-113, IEEE, URL: https://doi.org/10.1145/3352460.3358260.

Ghose et al., "A Workload and Programming Ease Driven Perspective of Processing-in-Memory", IBM Journal of Research & Development, vol. 63, Issue: 6, Nov. 2019, IBM, United States.

Ghose et al., "Enabling the Adoption of Processing-in-Memory: Challenges, Mechanisms", Future Research Directions, Carnegie Mellon University Invited Book Chapter, 45 pages, Feb. 2018, Cornell University (online: arXiv.org), URL: https://arxiv.org/pdf/1802.00320.pdf.

IBM Corporation, "dcbf (Data Cache Block Flush) instruction", IBM Documentation, URL: https://www.ibm.com/docs/en/aix/7.2?topic=set-dcbf-data-cache-block-flush-instruction, 2020, printed May 4, 2021, 3 pages.

IBM Corporation, dcbi (Data Cache Block Invalidate) instruction, IBM Documentation, URL: https://www.ibm.com/docs/en/aix/7.2?topic=set-dcbi-data-cache-block-invalidate-instruction, 2020, printed May 4, 2021, 3 pages.

International Search Report and Written Opinion, PCT/US2021/063345, Apr. 4, 2022, 9 pages.

International Search Report and Written Opinion, PCT/US2021/064663, May 10, 2022, 12 pages.

International Search Report and Written Opinion, PCT/US2022/052886, Mar. 20, 2023, 11 pages.

Islam et al., "Improving Node-Level MapReduce Performance Using Processing-in-Memory Technologies", European Conference on Parallel Processing (Euro-Par 2014: Parallel Processing Workshops), pp. 425-437, Springer International Publishing, Switzerland.

Jonathan Corbet, AutoNUMA: the other approach to NUMA scheduling, URL: https://lwn.net/Articles/488709/, dated Mar. 27, 2012, 5 pages.

Kwon et al., 25.4 A 20nm 6GB Function-In-Memory DRAM, Based on HBM2 with a 1.2TFLOPS Programmable Computing Unit Using Bank-Level Parallelism, for Machine Learning Applications, IEEE, 2021 IEEE International Solid-State Circuits Conference

(56) References Cited

OTHER PUBLICATIONS (ISSCC),URL: https://safari.ethz.ch/architecture_seminar/fall2021/lib/exe/fetch.php?media=kwon2021fimdram.pdf, DOI: 10.1109/ISSCC42613.2021.9365862, Date Added to IEEE Xplore: Mar. 3, 2021, 3 pages.
Loh et al., "A Processing-in-Memory Taxonomy and a Case for Studying Fixed-function PIM", 3rd Workshop on Near-Data Processing, Dec. 2013, 4 pages, University of Utah.
Mutlu et al., "Enabling Practical Processing in and near Memory for Data-Intensive Computing", Proceedings of the 56th Annual Design Automation Conference (DAC '19), Jun. 2019, Article No. 21 pp. 1-4, https://doi.org/10.1145/3316781.3323476.
Mutlu et al., "Processing Data Where It Makes Sense: Enabling In-Memory Computation", Journal of Microprocessors and Microsystems, vol. 67, Jun. 2019, pp. 28-41, Elsevier B.V., Amsterdam, The Netherlands.
Nam Sung Kim, A Journey to a Commercial-Grade Processing-In-Memory (PIM) Chip Development, HPCA 2021, The 27th IEEE International Symposium on High-Performance Computer Architecture (PCA-27), Seoul, South Korea, URL: https://hpca-conf.org/2021/keynotes/, dated Mar. 3, 2021, 3 pages.
Nyasulu, "System Design for a Computational-RAM Login-In-Memory Parallel Processing Machine", PHD Thesis, May 1999, 196 pages, Carleton University, Ottawa, ON, Canada.
Pugsley et al., "Analyzing the Impact of 3D-stacked Memory+Logic Devices on MapReduce Workloads", 2014 IEEE International Symposium on Performance Analysis of Systems and Software (ISPASS), Marcy 2014, pp. 190-200, IEEE, United States.
Santos et al., "Processing in 3D memories to speed up operations on complex data structures," IEE Design, Automation And Test in Europe Conference & Exhibition, Mar. 19-23, 2018, pp. 903-906.
Seshadri et al., "RowClone: Fast and Energy-Efficient In-DRAM Bulk Data Copy and Initialization", 2013 46th Annual IEEE/ACM International Symposium on Microarchitecture (Micro), DOI:10.1145/2540708.2540725, dated Dec. 2013, 13 pages.
Singh et al., "A Review of Near-Memory Computing Architectures: Opportunities and Challenges", EuroMicro Conference on DSD, Aug. 2018, 10 pages, IEEE, United States, DOI: 10.1109/DSD.2018.00106.
Yang et al., "A Processing-in-Memory Architecture Programming Paradigm for Wireless Internet-of-Things", Applications, Sensors Journal, Jan. 2019, 23 pages, MDPI, Basel, Switzerland.
Ghose et al., "Processing-in-memory: A workload-driven perspective," IBM Journal of Research and Development, DOI: 10.1147/JRD.2019.2934048, vol. 63, Issue 6, Date of Publication: Aug. 8, 2019, 19 pages.
Kim et al., "Exploration of a PIM Design Configuration for Energy-Efficient Task Offloading," 2019 IEEE International Symposium on Circuits and Systems (ISCAS), Date of Conference: May 26-29, 2019, Sapporo, Japan, DOI: 10.1109/ISCAS.2019.8702339, Date Added to IEEE Xplore: May 1, 2019, 4 pages.
Lee et al., "Design of Processing-"Inside"-Memory Optimized for DRAM Behaviors," IEEE Access, vol. 7,DOI: 10.1109/ACCESS.2019.2924240; Date of Publication: Jun. 21, 2019, 16 pages.
Pattnaik et al., "Scheduling Techniques for GPU Architectures with Processing-In-Memory Capabilities," PACT '16: Proceedings of the 2016 International Conference on Parallel Architectures and Compilation, DOI: http://dx.doi.org/10.1145/2967938.2967940, Published Sep. 11, 2016, 14 pages.
Kim et al., "Silent-PIM: Realizing the Processing-in-Memory Computing With Standard Memory Requests," IEEE Transactions on Parallel and Distributed Systems, Vo. 33, No. 2, Feb. 1, 2022, 12 pages.

* cited by examiner

Processor 301

Determine that a plurality of processor cores have each begun executing a sequence of offload instructions, wherein the sequence of offload instructions executing among the plurality of processor cores share the same process identifier 402

↓

Restrict the execution of non-offload instructions that are younger than any of the offload instructions 404

↓

Core 308

Process at least one offload instruction for an operation to be offloaded 302

↓

Place a lock on a memory address associated with the at least one offload instruction 304

↓

Remove the lock on the memory address in response to completing an operation targeting the memory address, 306

↓

In response to determining that each processor core has completed executing its sequence of offload instructions, remove the restriction 406

Core 410

FIG. 4

Processor 301

Determine that a plurality of processor cores have each begun executing a sequence of offload instructions, wherein the sequence of offload instructions executing among the plurality of processor cores share the same process identifier 402

Determine that each core has executed a start barrier instruction in the respective sequences of offload instructions 502

Restrict the execution of non-offload instructions that are younger than any of the offload instructions 404

Core 308

Process at least one offload instruction for an operation to be offloaded 302

Place a lock on a memory address associated with the at least one offload instruction 304

Remove the lock on the memory address in response to completing an operation targeting the memory address, 306

In response to determining that each processor core has completed executing its sequence of offload instructions, remove the restriction 406

Core 410

FIG. 5

Processor 301

Determine that a plurality of processor cores have each begun executing a sequence of offload instructions, wherein the sequence of offload instructions executing among the plurality of processor cores share the same process identifier 402

↓

Restrict the execution of non-offload instructions that are younger than any of the offload instructions 404

Core 308

Process at least one offload instruction for an operation to be offloaded 302

↓

Place a lock on a memory address associated with the at least one offload instruction 304

↓

Remove the lock on the memory address in response to completing an operation targeting the memory address, 306

↓

In response to determining that each processor core has completed executing its sequence of offload instructions, remove the restriction 406

Determine that an end barrier instruction has been executed on each core 602

Core 410

FIG. 6

Processor 301

Determine that a plurality of processor cores have each begun executing a sequence of offload instructions, wherein the sequence of offload instructions executing among the plurality of processor cores share the same process identifier 402

Restrict the execution of non-offload instructions that are younger than any of the offload instructions 404

Core 308

Process at least one offload instruction for an operation to be offloaded 302

Place a lock on a memory address associated with the at least one offload instruction 304

Remove the lock on the memory address in response to completing an operation targeting the memory address, 306

In response to determining that each processor core has completed executing its sequence of offload instructions, remove the restriction 406

Determine that an end barrier instruction has been executed on each core 602

Determine that all memory address locks triggered by the sequence of offload instructions have been removed 702

Core 410

FIG. 7

Processor 301

Determine that a plurality of processor cores have each begun executing a sequence of offload instructions, wherein the sequence of offload instructions executing among the plurality of processor cores share the same process identifier 402

↓

Restrict the execution of non-offload instructions that are younger than any of the offload instructions 404

Core 308

↓

Process at least one offload instruction for an operation to be offloaded 302

↓

Place a lock on a memory address associated with the at least one offload instruction 304

↓

Remove the lock on the memory address in response to completing an operation targeting the memory address, 306

↓

In response to determining that each processor core has completed executing its sequence of offload instructions, remove the restriction 406

Track the progress of each core in a status buffer communicatively coupled to each core 802

Core 410

FIG. 8

PRESERVING MEMORY ORDERING BETWEEN OFFLOADED INSTRUCTIONS AND NON-OFFLOADED INSTRUCTIONS

CROSS-REFERENCE TO RELATED APPLICATIONS

This is a continuation application of and claims priority for patent entitled to a filing date and claiming the benefit of earlier-filed U.S. Pat. No. 11,625,249, Apr. 11, 2023. Each patent application cited herein is hereby incorporated by reference in its entirety.

BACKGROUND

Computing systems often include a number of processing resources (e.g., one or more processors), which may retrieve and execute instructions and store the results of the executed instructions to a suitable location. A processing resource (e.g., central processing unit (CPU)) can comprise a number of functional units such as arithmetic logic unit (ALU) circuitry, floating point unit (FPU) circuitry, and/or a combinatorial logic block, for example, which can be used to execute instructions by performing logical operations on data (e.g., one or more operands). For example, functional unit circuitry may be used to perform arithmetic operations such as addition, subtraction, multiplication, and/or division on operands via a number of logical operations. Typically, the processing resources (e.g., processor and/or associated functional unit circuitry) may be external to a memory array, and data is accessed via a bus between the processing resources and the memory array to execute a set of instructions. To reduce the amount of accesses to fetch or store data in the memory array, computing systems may employ a cache hierarchy that temporarily stores recently accessed or modified data for use by a processing resource or a group of processing resources. However, processing performance may be further improved by offloading certain operations to a processor-in-memory (PIM) device, in which processing resources may be implemented internal and/or near to a memory, such that data processing is performed closer to the memory location storing the data rather than bringing the data closer to the processing resource. A PIM device may save time by reducing and/or eliminating communications between the processor and the memory device and may also conserve power.

Certain applications have phases of low or no temporal data reuse during which they frequently miss in the cache hierarchy and fetch data from memory. In addition, these phases may also exhibit low computational intensity (ratio of flops/byte). During those phases, energy efficiency and performance drops because data movement is high and the phase is memory bound. Accordingly, these phases are particularly suited for offloading to a PIM device or an accelerator. For example, the programmer can provide indications in the application source code that a particular code sequence should be offloaded, or the compiler may make such a determination. The interpretation and orchestration of offloaded instructions must still be performed by the processing resource(s) hosting the application.

BRIEF DESCRIPTION OF THE DRAWINGS

FIG. 4 sets forth a flow chart illustrating another example method of preserving memory ordering between offloaded instructions and non-offloaded instructions in accordance with embodiments of the present disclosure.

FIG. 5 sets forth a flow chart illustrating another example method of preserving memory ordering between offloaded instructions and non-offloaded instructions in accordance with embodiments of the present disclosure.

FIG. 6 sets forth a flow chart illustrating another example method of preserving memory ordering between offloaded instructions and non-offloaded instructions in accordance with embodiments of the present disclosure.

FIG. 7 sets forth a flow chart illustrating another example method of preserving memory ordering between offloaded instructions and non-offloaded instructions in accordance with embodiments of the present disclosure.

FIG. 8 sets forth a flow chart illustrating another example method of preserving memory ordering between offloaded instructions and non-offloaded instructions in accordance with embodiments of the present disclosure.

DETAILED DESCRIPTION

Figure 1:
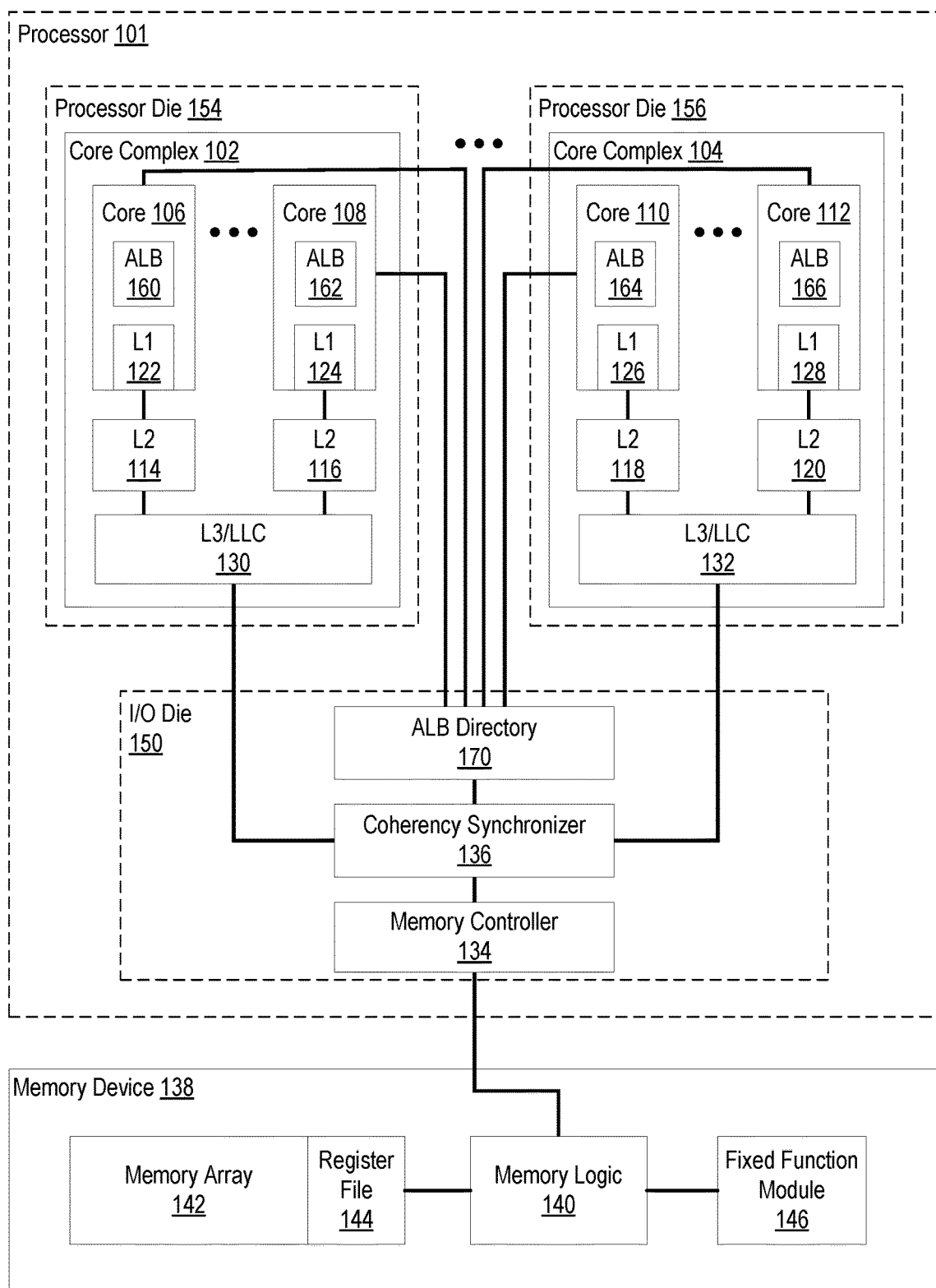
FIG. 1 sets forth a block diagram of an example system for preserving memory ordering between offloaded instructions and non-offloaded instructions according to embodiments of the present disclosure.

To reduce the burden on central processing unit (CPU) cores, certain operations may be offloaded for remote execution by an offload target device, such as a Processing-in-Memory (PIM) device or an accelerator. For example, PIM architectures support offloading instructions for execution in or near memory, such that bandwidth on the data link between the processor and the memory is conserved and power consumption of the processor may be reduced. Execution of offloaded instructions by, for example, a PIM device do not require loading data into local CPU registers and writing data from local CPU storage back to the memory.

To ensure memory ordering, a barrier or fence may be employed to separate offload instruction from non-offload instructions (i.e., locally CPU-executed operations). However, a conventional memory fence/barrier implementation may not be sufficient in preserving memory ordering between offload instructions and younger non-offload instructions in some architectures. A conventional memory fence or barrier blocks younger code from issuing until older code has retired. In an architecture where offload instructions retire at the CPU core before they pass the global synchronization point and complete on the offload target device, conventional barriers or fences cannot enforce memory ordering with younger non-offload instruction code. For example, a conventional fence/barrier instruction cannot ensure correct ordering of memory accesses between offload instructions and younger non-offload instructions (across all threads) because, in some architectures, younger non-offload load and store instructions are allowed to execute beyond the barrier/fence and access memory after older offload instructions retire and not after they pass a global coherence synchronization point. This can potentially result in scenarios where younger non-offload instructions, accessing the same addresses as the offload instructions, can fetch stale data resulting in incorrect execution.

Embodiments in accordance with the present disclosure provide hardware and instruction set architecture support in CPU cores, caches, and functional logic blocks that support memory ordering between instructions offloaded to an offload execution device and younger non-offloaded instructions, thereby ensuring mutually exclusive access to memory addresses shared by offload instruction code and following non-offload instruction code. These embodiments support synchronization primitives that enhance the performance of offloaded execution devices with a multicore CPU, and support the removal of restrictions on access to memory addresses shared by offload instruction code and following non-offload instruction code without waiting for the offloaded operations to complete on the offload device.

An embodiment in accordance with the present disclosure is directed to a method of preserving memory ordering between offloaded instructions and non-offloaded instructions that includes processing at least one offload instruction for an operation to be offloaded. The method also includes placing a lock on a memory address associated with the at least one offload instruction. The method also includes removing the lock on the memory address in response to completing an operation targeting the memory address. In some implementations, the operation to be offloaded is offloaded to an offload target device such as a processing-in-memory device.

In some implementations, placing a lock on a memory address associated with the at least one offload instruction includes storing the memory address in an entry of an address lock buffer; and wherein removing the lock on the memory address includes clearing the entry in the address lock buffer.

In some implementations, completing an operation targeting the memory address includes sending a probe request to one or more caches of one or more cores that contain an entry for the memory address, wherein the probe request indicates that data in the entry should be either invalidated or flushed. In some implementations, the lock is placed after the processing the at least one offload instruction completes. In some implementations, the lock is removed prior to execution of the operation on the remote device.

In some implementations, the method also includes determining that a plurality of processor cores have each begun executing a sequence of offload instructions, wherein the sequence of offload instructions executing among the plurality of processor cores share the same process identifier. In these implementations, the method also includes restricting the execution of non-offload instructions that are younger than any of the offload instructions. In these implementations, the method also includes, in response to determining that each processor core has completed executing its sequence of offload instructions, removing the restriction.

In some implementations, determining that a plurality of processor cores have each begun executing a sequence of offload instructions, wherein the sequence of offload instructions executing among the plurality of processor cores share the same process identifier includes determining that each core has executed a start barrier instruction in the respective sequences of offload instructions. In some implementations, determining that each processor core has completed executing its sequence of offload instructions includes determining that an end barrier instruction has been executed on each core. In some implementations, determining that each processor core has completed executing its sequence of offload instructions includes determining that all memory address locks triggered by the sequence of offload instructions have been removed. In some implementations wherein determining that each processor core has completed executing its sequence of offload instructions includes tracking the progress of each core in a status buffer communicatively coupled to each core.

An embodiment in accordance with the present disclosure is directed to a multicore processor for preserving memory ordering between offloaded instructions and non-offloaded instructions. The processor is configured to process an offload instruction for an operation to be offloaded. The processor is also configured to place a lock on a memory address or addresses associated with the offload instruction. The processor is also configured to remove the lock on the memory address in response to completing an operation targeting the memory address. In some implementations, the operation to be offloaded is offloaded to an offload target device such as a processing-in-memory device.

In some implementations, placing a lock on a memory address associated with the at least one offload instruction includes storing the memory address in an entry of an address lock buffer; and wherein removing the lock on the memory address includes clearing the entry in the address lock buffer.

In some implementations, completing an operation targeting the memory address includes sending a probe request to one or more caches of one or more cores that contain an entry for the memory address, wherein the probe request indicates that data in the entry should be either invalidated or flushed. In some implementations, the lock is placed after the processing the at least one offload instruction completes. In some implementations, the lock is removed prior to execution of the operation on the remote device.

In some implementations, the processor is also configured to determine that a plurality of processor cores have each begun executing a sequence of offload instructions, wherein the sequence of offload instructions executing among the plurality of processor cores share the same process identifier. In these implementations, the processor is also configured to restrict the execution of non-offload instructions that are younger than any of the offload instructions. In these implementations, the processor is also configured to, in response to determining that each processor core has completed executing its sequence of offload instructions, removing the restriction.

In some implementations, determining that a plurality of processor cores have each begun executing a sequence of offload instructions, wherein the sequence of offload instructions executing among the plurality of processor cores share the same process identifier includes determining that each core has executed a start barrier instruction in the respective sequences of offload instructions. In some implementations, determining that each processor core has completed executing its sequence of offload instructions includes determining that an end barrier instruction has been executed on each core. In some implementations, determining that each processor core has completed executing its sequence of offload instructions includes determining that all memory address locks triggered by the sequence of offload instructions have been removed. In some implementations wherein determining that each processor core has completed executing its sequence of offload instructions includes tracking the progress of each core in a status buffer communicatively coupled to each core.

An embodiment in accordance with the present disclosure is directed to a system for preserving memory ordering between offloaded instructions and non-offloaded instructions. The system includes a processing-in-memory (PIM) device and a multicore processor that is configured to process an offload instruction for an operation to be offloaded to the PIM device. The processor is also configured to place a lock on a memory address associated with the offload instruction. The processor is also configured to remove the lock on the memory address in response to completing an operation targeting the memory address.

In some implementations, placing a lock on a memory address associated with the at least one offload instruction includes storing the memory address in an entry of an address lock buffer; and wherein removing the lock on the memory address includes clearing the entry in the address lock buffer.

In some implementations, completing an operation targeting the memory address includes sending a probe request to one or more caches of one or more cores that contain an entry for the memory address, wherein the probe request indicates that data in the entry should be either invalidated or flushed. In some implementations, the lock is placed after the processing the at least one offload instruction completes. In some implementations, the lock is removed prior to execution of the operation on the remote device.

In some implementations, the processor is also configured to determine that a plurality of processor cores have each begun executing a sequence of offload instructions, wherein the sequence of offload instructions executing among the plurality of processor cores share the same process identifier. In these implementations, the processor is also configured to restrict the execution of non-offload instructions that are younger than any of the offload instructions. In these implementations, the processor is also configured to, in response to determining that each processor core has completed executing its sequence of offload instructions, removing the restriction.

In some implementations, determining that a plurality of processor cores have each begun executing a sequence of offload instructions, wherein the sequence of offload instructions executing among the plurality of processor cores share the same process identifier includes determining that each core has executed a start barrier instruction in the respective sequences of offload instructions. In some implementations, determining that each processor core has completed executing its sequence of offload instructions includes determining that an end barrier instruction has been executed on each core. In some implementations, determining that each processor core has completed executing its sequence of offload instructions includes determining that all memory address locks triggered by the sequence of offload instructions have been removed. In some implementations wherein determining that each processor core has completed executing its sequence of offload instructions includes tracking the progress of each core in a status buffer communicatively coupled to each core.

FIG. 1 sets for a block diagram illustrating an example system 100 for preserving memory ordering between offloaded instructions and non-offloaded instructions according to various embodiments of the present disclosure. In the example of FIG. 1, the system 100 includes a multicore processor 101 that includes multiple core complexes 102, 104. For example, the processor 101 may be implemented in a system-on-chip (SoC) architecture. In the example depicted in FIG. 1, each core complex 102, 104 includes multiple processor cores 106, 108, 110, 112 (e.g., central processing unit (CPU) cores, graphical processing unit (GPU) cores, etc.) respectively coupled to second-level (L2) caches 114, 116, 118, 120. Further, each of the processor cores 106, 108, 110, 112 includes respective on-board primary (L1) caches 122, 124, 126, 128. Each of the processor cores 106, 108, 110, 112 includes various components of a processor pipeline (not depicted) such as an instruction fetch, decode, and dispatch pipeline, prefetch input queues, schedulers, load/store queues, lookaside buffers, reorder buffers, and retire queues as well as various arithmetic logic units (ALUs) and register files.

The configuration of the example system 100 depicted in FIG. 1 is presented for the purpose of explanation. Readers will appreciate that, while four processor cores 106, 108, 110, 112 are depicted in FIG. 1, the processor 101 may include more or fewer processor cores than depicted, as well as more or fewer core complexes, as well as more or fewer caches.

In the example depicted in in FIG. 1, each core complex 102, 104 includes a third level (L3) cache 130, 132 that serves as an interconnect cache, or last level cache (LLC), that connects all of the L2 caches of a particular core complex. In some examples, the processor 101 is configured to execute multithreaded applications using the multiple processor cores 106, 108, 110, 112. In these examples, a modification of data in a cache in one core complex 102 may affect the validity of data cached in another core complex 104. To enforce cache coherency, the processor 101 may include a coherency synchronizer 136 coupled to each L3 cache 130, 132 of the core complexes 102, 104. In these examples, the coherency synchronizer 136 initiates cache operations, for example, by transmitting cache probes to invalidate or flush data contained in cache entries of any L1, L2, or L3 cache present in the processor 101.

Each L1, L2, and L3 cache includes cache logic that, in response to a processor request, determines whether data associated with a requested operation is present in a cache entry of the cache. If the data is present (a 'cache hit'), the processor request is fulfilled using the data present in the cache entry. If the data is not present (a 'cache miss'), the request is forwarded to the next-level cache until a cache miss is detected in the LLC. In response to a cache miss in the LLC, the request is forwarded to a memory controller 134 of the processor 101 to fulfill the request using data stored in main memory (e.g., memory device 138). In one example, the processor requests are I/O operations, such as read/write requests, directed to a memory location in the memory device 138.

Each of the processor cores 106, 108, 110, 112 executes machine language code created by a compiler system (e.g., GNU Compiler Collection (GCC)) from an application that executes on the processor 101. For example, the application may be a single-threaded or multithreaded application. The processor cores implement an instruction set architecture (ISA) utilized by the compiler system for generating the machine language code. In one example, the ISA for the processor 101 is the x86-64 instruction set with support for advance vector extension such as AVX-256.

In accordance with various embodiments of the present disclosure, the processor 101 implements an extended ISA for processing offload instructions for execution by an offload target device. For example, the offload target device may be a remote component that implements fixed functions, such as a processing-in-memory (PIM) device or an accelerator, as described in more detail below. The offload target device is a remote component in that execution logic for executing the offload instructions is not part of any processor core. For example, the offload target device may be implemented on the same chip or in the same package as the processor cores 106, 108, 110, 112 while remaining "remote" from the processor 101. In an example extended ISA, a remote_load instruction opcode loads data of a memory operand from main memory into a local register of the offload target device, while a remote_store instruction opcode writes data from a local register of the offload target device to a memory operand in main memory. A remote_op instruction opcode in the extended ISA can represent any arithmetic or logical operation supported by the target device's fixed function architecture. None of the operations modifies control flow and thus the offloaded instructions are executed in sequence. The offload remote_op instruction source operands can be (a) a memory address (specified in the same way as in the baseline ISA), (b) an architectural register (from the CPU core standard ISA), or (c) an offload target register implemented in the offload target device. In some implementations, an offload instruction destination operand can only be an offload target register. The offload target registers are architected registers within the extended ISA that represent registers local to the offload target fixed function logic and are allocated by the compiler. The offload target registers are virtual in that they have no physical storage in the processor core, and are used to support data dependencies between offload instructions and to track offload target register usage at the memory controller 134 when the offload requests are sent to fixed function module 146.

In some implementations, the remote_load instruction includes a destination operand that is an offload target register, a source operand that is a memory address, and another source operand that is an architectural register that is used to generate a memory address. The remote_load instruction indicates that the offload target device should load data from the memory location identified by the memory address into the offload target register. In the case where the offload target is a PIM device, the remote_load instruction indicates that the PIM device should load the data from the memory location in the PIM device identified by the memory address into a PIM register, as explained in detail below.

In some implementations, the remote_store instruction includes a destination operand that is a memory address, a source operand that is an offload target register and another source operand that is an architectural register used to generate the memory address. The remote_store instruction indicates that the offload target device should store data in the offload target register to a memory location identified by the memory address. In the case where the offload target device is a PIM device, the remote_store instruction indicates that the PIM device should store data from the target register in the memory location in the PIM device identified by the physical memory address, as explained in detail below.

In some implementations, the remote_op instruction includes a destination operand that is an offload target register and source operands for a computation, where the source operands may be architectural registers (carrying values from prior non-offloaded computations), offload target registers or a memory address (generated from an architectural register also specified in the remote_op instruction). The remote_op instruction indicates that fixed function logic in the offload target device should perform the computation and place the result in the offload target register indicated by the destination operand. In the case where the offload target device is a PIM device, the remote_op instruction indicates that the PIM device should perform a function within the memory logic of the PIM device, as explained in detail below.

In some implementations, the offload instructions are generated by the compiler at application compile time using the extended ISA. In one example, the compiler identifies offload instructions in source code based on indications in application source code provided by the programmer, for example, using an application programming interface (API) for offloading. In another example, the compiler identifies instructions for offloading based on a determination that the instructions are suitable for offloading. The offload instructions may be identified as a region of interest (ROI) in the source code. Each dynamic instance of an ROI in the source code may be identified as an offload transaction that includes one or more offload instructions. For example, an offload transaction may include remote_load instruction, one or more remote_op instructions, and a remote_store instruction. An offload transaction can be a loop iteration or a subroutine or a subset of subroutine's body. The offload transaction is a sequential piece of code and does not include any control flow changing instructions. In some examples, special instructions can mark the beginning and end of each offload transaction.

In some implementations, an offload instruction is fetched, decoded, and dispatched (e.g., by the front-end pipeline of the core), as would be performed for any typical non-offload instruction. After the offload instruction is dispatched and once the offload instruction has been picked by a scheduler, core resources are used to generate virtual and/or physical addresses for any memory locations identified in the offload instruction (e.g., in remote_load, remote_store and remote_op instructions that have a memory operand) and any values consumed by offload instructions from core registers (e.g., computed from non-offload instructions). After the virtual and/or physical addresses have been generated and the values from core registers are available, an offload instruction is ready to retire. Even though offload instructions are picked by a scheduler, these instructions do not execute any operations in the core's ALUs (vector or scalar, integer or floating point), neither do they modify machine state when issued by the core, including architected registers and flags as defined in the core's standard ISA. Offload instructions are ready to retire as soon as they have completed the operations (address generation and/or reading values computed by non-offload instructions) mentioned above without violating memory ordering. In the event of pipeline flushing (e.g., due to branch mispredictions, load-store forwarding data dependence violations, interrupts, traps, etc.), the offload instructions can be flushed like conventional instructions because they occupy instruction window entries like non-offload instructions. Further, because remote_op instructions do not execute on the core's ALUs, no arithmetic error traps are detected for them. However, other traps (e.g., for virtual or physical address generation, instruction breakpoints, etc.) generated by offload instructions are detected and served inside the core pipeline with the same mechanisms used for non-offload instructions.

Once each offload instruction retires, the generated memory addresses and values of any core register operands are included in an offload request generated for the offload instruction. The offload request includes the offload target register as well as any generated memory address or register values need to complete the offload instruction and store the result in the offload target register. In some implementations, an offload request first-in-first-out (FIFO) queue for the offload requests is utilized to maintain programmatic sequence for the instructions as they retire. In one example, the offload instruction may be retired only when the end of an offload transaction is reached in the offload request FIFO. There may be one offload request FIFO per thread if the core supports multithreading. Each offload request is issued to the offload target device in program order by the core at retire time to be executed in the same program order remotely in the offload target device.

In some examples, after an offload request is issued by a processor core 106, 108, 110, 112, the offload request is received by the coherency synchronizer 136. The coherency synchronizer 136 performs cache operation on the various caches of the core complexes 102, 104 to ensure that any cache entries for virtual and/or physical addresses identified in the offload request remain coherent. For example, when an offload request includes as an operand a virtual and/or physical address, the coherency synchronizer 136 performs a cache probe to identify cache entries in the L1, L2, and L3 caches of the core complex that contain cache entries for the virtual and/or physical addresses identified in the offload request. If the identified cache entry contains clean data, the cache entry is invalidated. If the identified cache entry contains dirty data, the data in the cache entry is flushed to main memory (i.e., the memory device). In some examples, cache entries corresponding to virtual and/or physical addresses identified in the offload request issued by a particular core in a core complex may be invalidated/flushed before reaching the coherency synchronizer 136, such that the coherency synchronizer 136 performs the cache probe only on other core complexes in the system 100. In other examples, the coherency synchronizer 136 receives the offload request directly and performs the cache probe on all core complexes in the system 100. A memory fence may be employed to ensure that younger non-offload instructions do not access any cache entries for virtual and/or physical addresses identified in the offload request(s) until those cache entries have been invalidated or flushed. In this way, the younger non-offload instructions are prevented from accessing stale cache data and must instead retrieve the data from main memory (which may have been modified by a prior offload request). After the appropriate cache operations have completed, the offload request is transmitted to the memory controller 134 for offloading to the offload target device. The operation of the coherency synchronizer will be described in greater detail below.

In some implementations, the memory controller 134 receives the offload requests, which may be configured as write requests with a flag that indicates the write request is an offload request. In these implementations, the memory controller 134 decodes the request to determine that the request is an offload request and identifies the offload instruction as well as operands for completing the offload request. The memory controller 134 identifies the requested operation via a pointer to a command buffer located in the offload target device from the offload request. The memory controller 134 breaks the offload request into one or more commands that are transmitted to the offload target device. In examples where the target device is a PIM device, the request may be a PIM request that is broken into one or more PIM commands by the memory controller 134.

In the example depicted in FIG. 1, the processor 101 is coupled to a memory device 138 that includes one or more memory arrays 142 for storing data. In some examples, the memory device 138 is a stacked dynamic random-access memory (DRAM) device that includes multiple memory dies stacked on a memory interface logic die that interfaces with the processor 101. For example, the memory device 138 may be a high bandwidth memory (HBM) module or a hybrid memory cube (HMC) module. In these examples, the HBM module may be integrated in an SoC with the processor 101 or coupled to the processor 101 through an interposer. In other examples, the memory device 138 may be an in-line memory module such as a dual in-line memory module (DIMM) that includes memory interface logic. The memory controller 134 issues commands to the memory logic 140 of the memory device 138, such as read requests, write requests, and other memory operations. In some implementations, commands transmitted to the memory device 138 by the memory controller 134 may be flagged as offload commands.

In some embodiments, the memory device 138 includes a processing-in-memory (PIM) device in that the memory logic 140 is designed to perform memory operations and a set of non-memory operations or functions (e.g., arithmetic and logical operations) within the memory device 138. In some implementations, the memory device 138 includes a separate register file 144 that may be used to provide operands to operate on by the functions.

In embodiments where the offload target is the memory device 138, and where the memory device is a PIM device, the memory device 138 receives offload commands generated from the offload requests from the memory controller 134 of the processor 101. In the example depicted in FIG. 1, the memory logic 140 is coupled to fixed function module 146 for implementing fixed functions identified in a PIM request. The fixed function module 146 may include a command buffer that is populated with the actual commands to be executed by the fixed function module 146 after a thread including the offload instruction is launched. In some implementations, the opcode of each offload instruction includes an embedded pointer to the command for the operation (load, store, add, subtract, multiply, increment, etc.) that is to be performed in the offload target device. When an offload request is generated from an offload instruction, this pointer is also included in the offload request. In these implementations, when generating the offload commands, the memory controller uses the pointer in the offload request to identify the location in the command buffer of the offload target device that includes the actual command for the operation.

In some examples, the coherency synchronizer 136 and memory controller 134 may be implemented on an I/O die 150 that is distinct from dies 154, 156 implementing the core complexes 102, 104. The I/O die 150 may be coupled through one or more channels to a memory interface die (not shown) that includes the memory logic 140 and fixed function module 146. One or more memory components each including a memory array 142 may be stacked on top of the memory interface die and coupled to the memory interface die using through-silicon vias. The I/O die 150 may be coupled to the core complex dies 154, 156 through an on-chip fabric. In various examples, the memory device 138 is a remote execution device in that execution logic for executing PIM offload instructions is not part of any processor core. For example, the memory device 138 may be implemented on the same chip or in the same package as the processor cores 106, 108, 110, 112 while remaining "remote" from the processor 101 with respect to execution locality. In some examples, the processor 101 and the memory device 138 of the system 100 are integrated on the same chip (e.g., an SoC). In other examples, the system 100 implements a system-in-package (SiP) architecture in which the processor 101 and its components (e.g., as an SoC) are placed on an interposer wafer along with the memory device 138 in the same semiconductor package. While the example system 100 is described as including processor dies 154, 156, the I/O die 150, and one or more dies of the memory device 138, readers will appreciate that the system may be implemented by more or fewer dies, and that components thereof may be integrated or distributed across any number of dies.

In some implementations, depicted in FIG. 1, each core 106, 108, 110, 112 includes a respective address lock buffer (ALB) 160, 162, 164, 166. When an offload instruction (e.g., remote_load or remote_store) includes a memory operand, the memory address generated from the memory operand is stored in an entry in the ALB and the entry is marked valid. The presence of memory address in a valid entry of the ALB effectively locks the memory address by preventing younger non-offload instructions executing on the core from accessing the locked memory address. The memory address may remain locked while cache operations are performed to guarantee that the younger non-offload instructions executing on the core will not access stale or invalid data. The memory address may be unlocked when such cache operations have been initiated or completed. For example, the memory address may be unlocked by marking the entry containing the memory address as invalid, thus allowing a new memory address to occupy that entry. If the ALB is full of valid entries, an offload instruction that includes a memory operand may be stalled until an entry in the ALB becomes available.

In some implementations, the memory address is unlocked upon receiving an unlock request from the coherency synchronizer 136. When the coherency synchronizer 136 receives the offload request generated by the core, the coherency synchronizer 136 transmits a cache probe to invalidate or flush data corresponding the memory address that may be present in various caches (L1, L2, L3) in each core complex of the processor 101, as described above. In some examples, the coherency synchronizer 136 transmits the unlock request to the ALB of the core that sent the offload request when a probe filter in the coherency synchronizer 136 transmits invalidation/flush probe requests the caches of other cores or core complexes. In these examples, if the probe filter determines that there are no caches that include cache entries for the target memory address, the unlock request is returned to the ALB without sending any probe requests.

It is safe for the coherency synchronizer 136 to initiate the unlock requests in parallel with the probe requests in a single-threaded scenario because the accesses by younger non-offload instructions are guaranteed to arrive at the caches after the data in the targeted cache entries has been invalidated or flushed. This is because the ALB entry must be cleared by the unlock request before any younger non-offload memory accesses are initiated. By the time the unlock request arrives at the core, the invalidation/flush probes will already be at the cache controllers or have completed across all core complexes. In a multi-threaded scenario, special instructions at the beginning and end of an offload transaction (discussed in detail below) will ensure that non-offload instructions will not access data in the cache entries before they have been invalidated or flushed from the caches by the probe requests. By that time, the younger non-offload memory requests will be serialized behind their dependent offload requests, guaranteeing that they will observe the data after offload requests have completed.

In this way, the ALB can be used to store the memory addresses targeted by retired remote_load and remote_store instruction requests that are currently in transit towards the probe filter or in the process of invalidating/flushing data after probing the probe filter. The memory addresses in ALB are locked and younger non-offload accesses that hit in the ALB are blocked from accessing memory. In some examples, offload instruction granularity could be larger than a cache line size and hence in some implementations an ALB entry can track addresses larger than a cache line. Alternatively, an ALB entry granularity can remain the same as that of a cache line, so multiple ALB entries may be created one per cache line for an offload instruction whose granularity is larger than a cache line.

Consider an example where a core (e.g., core 106) processes the following sequence of offload instructions in a single-threaded application, where a register r1 is an architected register in the extended ISA as discussed above. For example, the register r1 may be allocated in the offload device by an application compiler at compile time. In a thread of the application hosted on the processor system, the core may execute the following code sequence (i.e., offload transaction):

remote_load r1, WORD PTR [rsi+rax]
    remote_op . . .
    remote_op . . .
    remote_op . . .
    remote_store [rdi+rax], r1

In the above sequence of offload instructions, the core executes the remote_load instruction by generating a memory address for the memory operand that is a pointer to rsi+rax, which, for this example, is calculated to be 0xffffc70. Memory ordering checks for the address are also performed with respect to older instructions. When the remote_load instruction retires, the core generates an offload request for the offload target device to load the data at 0xffffc70 into the target device's local register r1, and the address 0xffffc70 is added to an open entry in the ALB 160 and the entry is marked valid. At this time, younger non-offload instructions in the core's pipeline that target 0xffffc70 are stalled. In this example, the core then executes one or more remote_op instructions that may generate requests for the offload target device to perform various operations (the various remote_op instructions), the results of which are written into register r1. The core then executes the remote_store instruction by generating a memory address for the memory operand that is a pointer to rdi+rax, which, for this example, is calculated to be 0xdfffc70. Memory ordering checks for the address are also performed with respect to older instructions. When the remote_store instruction retires the core generates an offload request for the offload target device to store the data in register r1 at 0xdfffc70 in memory, and the address 0xdfffc70 is added to an open entry in the ALB 160 and the entry is marked valid. At this time, younger non-offload instructions in the core's pipeline that target 0xdfffc70 are stalled.

Continuing this example, when the offload request for the remote_load instruction is received at the coherency synchronizer 136, the coherency synchronizer transmits probe requests (e.g., utilizing a probe filter) to various caches in the core complexes 102, 104 that contain a cache entry for the memory address 0xffffc70, where the probes request the cache controller to invalidate clean data or flush dirty data stored in that entry. The coherency synchronizer 136 also transmits an unlock request to the ALB 160 to unlock 0xffffc70. When the unlock request for 0xffffc70 is received at the core, the ALB entry for 0xffffc70 is marked invalid. Similarly, when the offload request for the remote_store instruction is received at the coherency synchronizer 136, the coherency synchronizer transmits probe requests (e.g., utilizing a probe filter) to various caches in the core complexes 102, 104 that contain a cache entry for the memory address 0xdfffc70, where the probes request the cache controller to invalidate clean data stored in that entry. The coherency synchronizer 136 also transmits an unlock request to the ALB 160 to unlock 0xdfffc70. When the unlock request for 0xdfffc70 is received at the core, the ALB entry for 0xdfffc70 is marked invalid.

In this way, the memory addresses that are targeted by younger non-offload (i.e., locally executed) instructions may be unlocked to allow execution of those instructions because those accesses are guaranteed to arrive at the cache controllers after the cache operations have completed. Furthermore, because the offload instructions are transmitted in program order to the offload target device, the processor 101 need not wait for acknowledgements from the offload target device before allowing the younger non-offload instructions to retire. Still further, if there is no dirty data to flush in any of the processor system caches 114-132, the offload requests may be transmitted without waiting for probe responses.

Readers of skill in the art will recognize that memory addresses generated from memory operands of offload instructions may be locked in a variety of ways, so long as younger non-offload instructions executing on the core are prevented from accessing the memory addresses until the above-described cache operations can be initiated or completed. Readers of skill in the art will also recognize that, in place of a probe filter, each cache may be probed to determine whether a cache entry for the target memory address is present.

In some implementations, to accommodate a multithreaded application with multiple cores processing offload instructions, two additional synchronization primitives are included in the extended ISA. A barrier initialization primitive (i.e., a barrier_start instruction) occurs at the beginning of an offload transaction, while a barrier initialization primitive (i.e., a barrier_end instructions) occurs at the end of an offload transaction. The barrier_start and barrier_end instructions may be introduced by the programmer directives or by the compiler. In these implementations, the barrier_start and barrier_end instructions are used in conjunction with an ALB directory 170 shared by all of the cores 106, 108, 110, 112 in the processor 101 to track the progress of each core in processing the offload transaction. In the example depicted in FIG. 1, the ALB directory 170 is implemented adjacent to the coherency synchronizer 136 (e.g., on the same die). The ALB directory 170 includes controller for communicating with the cores and tracking the progress of offload instructions executing on the cores using a structure to record the status of each multithreaded offload transaction. The ALB directory 170 tracks, for each core executing a kernel of an offload transaction in a multithreaded process, which cores have encountered the barrier_start instruction and the barrier_end instruction. For example, the ALB directory 170 may include a barrier status vector associated with a particular process identifier of the multithreaded process, where each bit of the barrier status vector represents a core identifier. In such an example, the bit representing a particular core may be asserted when that core begins executing an offload transaction (e.g., when the barrier_start instruction is executed) and may be cleared when the core completes the offload transaction (e.g., after the barrier_end instruction is executed).

In some implementations, as depicted in FIG. 1, each core 106, 108, 110, 112 includes a respective ALB 160, 162, 164, 166 that is communicatively coupled to the ALB directory 170. Each time an offload instruction such as a remote_load or remote_store instruction retires, the memory address generated from the memory operand of the offload instruction occupies an entry in the ALB of the core. Each offload request carries the process identifier of the thread, which can be accessed from the table lookaside buffer as part of the translation lookup for the memory address in the offload request. The barrier_start instruction indicates that a particular thread of a process executing on a particular core is about to execute offload instructions for an offload transaction. The process identifier of the thread as well as the core identifier and/or the thread identifier is recorded by the ALB directory 170. In other words, upon execution of the barrier_start instruction, the ALB directory 170 records that a particular core is executing an offload transaction for a thread of a particular process. The ALB directory 170 tracks the progress of cores that are executing offload transactions for threads having the same process identifier. As each core executes the barrier_end instruction and clears its ALB after all of the offload instructions in the offload transaction have retired, the ALB directory 170 records that the particular core has completed the processing for the offload transaction corresponding to the process identifier. When the ALB directory 170 receives notification from all cores that are processing the offload transactions corresponding to the process identifier (i.e., when all cores have encountered the barrier_end instruction and cleared their respective ALB s), the ALB directory 170 sends a notification to those cores that a semaphore blocking execution of younger non-offload instructions may be cleared. Upon receiving this notification, the cores retire the barrier_end instruction and allow younger non-offload instructions to begin executing.

Thus, the controller of the ALB directory 170 blocks all the threads from executing non-offload instructions until all threads clear their respective ALB s (which guarantees that the younger non-offload instructions will not see data targeted by offload instructions in the caches). This event marks the retirement of a barrier_end instruction. Thus, by stalling execution of the younger non-offload instructions on all of cores executing the multithreaded offload transaction until the barrier_end instruction retires on all cores, memory ordering between these offload transactions and the younger non-offload instructions is preserved.

In some implementations, the barrier_start instruction signals the number of threads that are co-executing a multithreaded offload transaction. In one example, the barrier_start instruction has the format "barrier_start Rx" where architectural register Rx contains the number of threads running the offload transaction (e.g., a PIM kernel) simultaneously. In such an example, register Rx is loaded by the application before the threads are forked, for example, using the same mechanism as a software barrier. The thread count held by register Rx is communicated to the ALB directory 170 upon executing the barrier_start instructions at the beginning of each offload transaction. In some cases, the barrier_start instruction does not need to synchronize the threads and younger offload, and non-offload instructions from the offload transaction (i.e., offload code region) can issue without waiting for the barrier_start instruction to complete or retire. Even if multiple threads send the barrier_start to the ALB directory 170, the thread count is recorded only once by the ALB directory 170. The thread count identified from the barrier_start instruction is recorded in the entry for the thread's process identifier of the ALB directory 170.

In another example, the barrier_start instruction has the format "barrier_start [Rx]" where the thread count is loaded from a memory location identified in the architectural register Rx. In this case, the latency to read the thread count from memory is non-deterministic, therefore the barrier_start instruction blocks execution of younger instructions in the thread until ALB directory 170 acknowledges receipt of the thread count to all cores running threads of the same process. The acknowledgement is sent to all cores as soon as the last barrier_start message arrives at the ALB directory 170 for the process. Thus, execution of the younger instructions in the offload transaction is blocked until all threads have synchronized by sending their barrier_start notifications to the ALB directory 170. Even if multiple threads send the barrier_start notification to the ALB directory 170, the thread count is recorded only once by the ALB directory 170. The thread count identified from the barrier_start instruction is recorded in the entry for the thread's process identifier of the ALB directory 170.

In another example, the barrier_start instruction also has the format "barrier_start [Rx]" where the thread count is loaded from a memory location identified in the architectural register Rx. In this example, all threads need not be blocked and only the first thread that is executing the barrier_start instruction is responsible for loading the thread count data from memory into the ALB directory 170. For example, a special flag bit may be set in the ALB directory entry for the process. In one example, a thread count fetch (TCF) bit is set by the thread whose barrier_start notification first reaches the ALB directory 170. A set TCF bit indicates that the thread count is being fetched from memory for all other threads of the same process. Subsequently, the ALB directory 170 receives barrier_start notifications from the other threads of the same process, identifies from the TCF bit that a thread count fetch operation is in progress, and sends an acknowledgement back to the respective cores allowing younger instructions (offload or non-offload) to issue. Thus, it is not necessary for threads to wait for the thread count to be fetched back from memory. Once the thread that first set the TCF bit fetches the thread count from memory, it resets the TCF bit and stores the thread count in the ALB directory entry for the process.

In these examples, the count will indicate to the ALB directory 170 the number of threads executing an offload transaction and will be used by the barrier_end instruction. The ALB directory 170 maintains a barrier status bit vector with a length equal to the maximum number of threads in the processor (or less) that tracks the barrier status of all threads per process. Each bit vector entry corresponds to a single thread in the processor. When the barrier_end instruction is executed on each thread, it blocks execution of younger, non-offload instructions until an acknowledgement back from the ALB directory 170. It also sends a barrier_end request to the ALB directory 170. The barrier_end request resets the corresponding bit-vector entry for the thread. When the entire bit vector is reset, the ALB directory 170 sends the acknowledgment to all threads of the process and resets the thread count value stored for the process. The acknowledgement from the ALB directory 170 lifts the barrier for all threads of the same process and execution of non-PIM code following the PIM-code can resume.

Consider an example where a multithreaded application hosted on the processor 101 results in the execution of parallel offload transaction executing on each of the cores 106, 108, 110, 112 depicted in FIG. 1. It is assumed here that the multithreaded application has been parallelized so that all threads execute the same code path, as is frequently the case in high performance computing kernels as well as machine learning inference and training. Eventually, each core encounters the barrier_start instruction. When each core executes the barrier_start instruction, the core indicates to the ALB directory 170 that the barrier_start instruction has been encountered along with the process identifier of the thread as well as the core identifier and/or the thread identifier. The ALB directory 170 maintains a barrier status vector for each process identifier. In response to receiving this indication from a core, the ALB directory 170 sets the barrier status vector bit corresponding to core identifier of that core to '1' in the barrier status vector of the corresponding process identifier entry. Once all of the cores 106, 108, 110, 112 have executed the barrier_start instruction and notified the ALB directory 170, the barrier status vector corresponding to the process identifier would be '1111'. In some examples, the thread count (i.e., the number of threads co-executing the offload transaction), is loaded from a register or from memory. The thread count may for the offload transaction be used to determine that all cores have executed the barrier_start instruction of their respective offload transactions. In some examples, the ALB directory 170 may synchronize the execution of the offload transaction by indicating to each core that, once the barrier status vector has been initialized, the cores may begin executing the offload instructions. In other examples, the execution of the instructions in the offload transaction for a thread may begin as soon as the ALB directory 170 acknowledges receipt of the barrier_start request.

Continuing this example, the cores begin executing and retiring offload instructions. When each core executes the barrier_end instruction, and once the core has cleared its ALB, the core notifies the ALB directory 170 that the barrier_end instruction has been encountered. For example, in an arbitrary example order, when the core 106 notifies the ALB directory 170 that the barrier_end instruction has been reached and its ALB 160 is clear, the ALB directory 170 updates the barrier status vector for the process identifier to '0111'. When the core 110 notifies the ALB directory 170 that the barrier_end instruction has been reached and its ALB 164 is clear, the ALB directory 170 updates the barrier status vector for the process identifier to '0101'. When the core 108 notifies the ALB directory 170 that the barrier_end instruction has been reached and its ALB 162 is clear, the ALB directory 170 updates the barrier status vector for the process identifier to '0001'. When the core 112 notifies the ALB directory 170 that the barrier_end instruction has been reached and its ALB 166 is clear, the ALB directory 170 updates the barrier status vector for the process identifier to '0000' and is therefore empty. Once the barrier status vector of the process identifier is empty, the ALB directory 170 notifies the cores 106, 108, 110, 112 to lift the barrier and begin execution of younger non-offload instructions.

Figure 2:
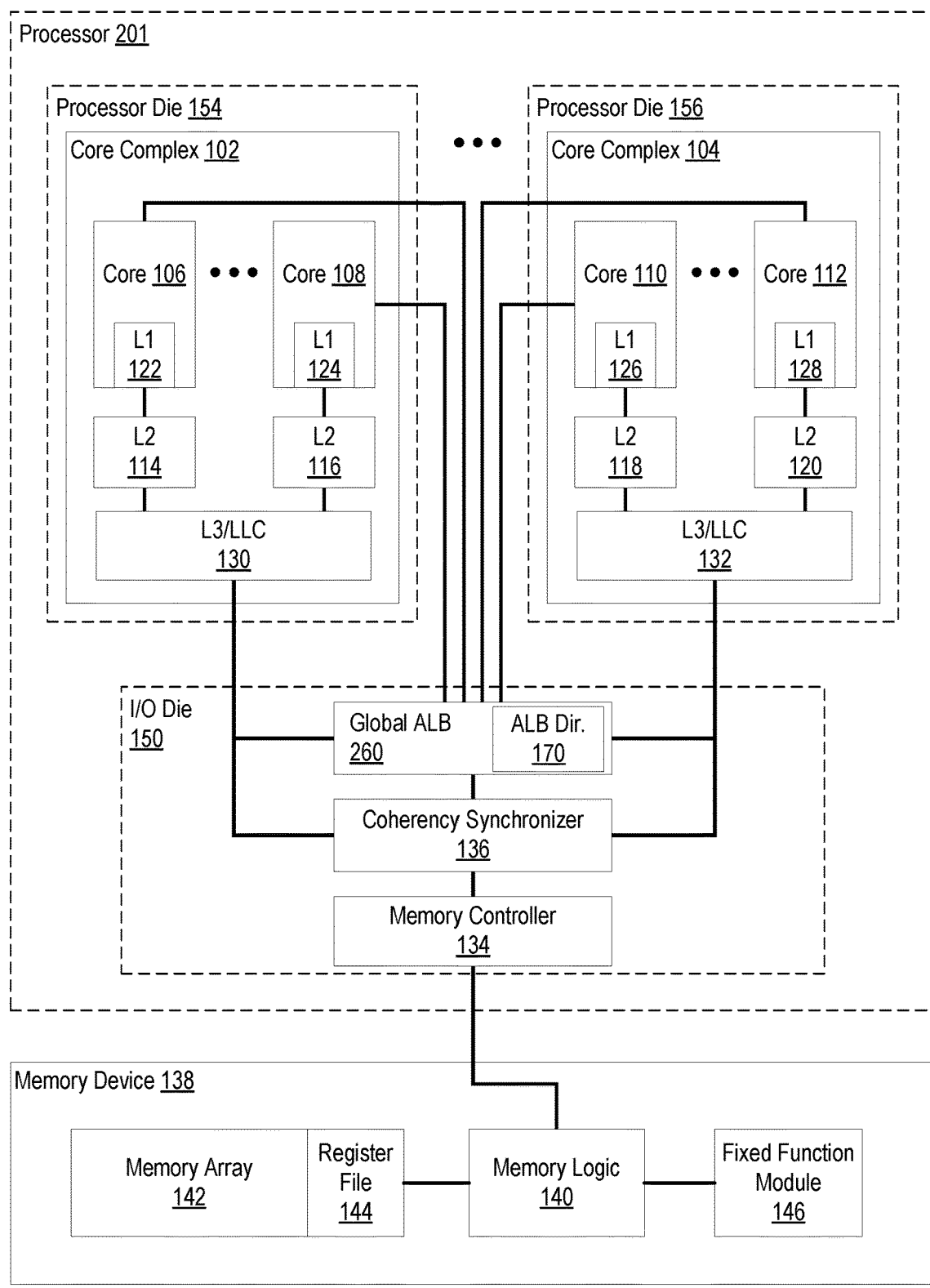
FIG. 2 sets for a block diagram of another example system for preserving memory ordering between offloaded instructions and non-offloaded instructions according to embodiments of the present disclosure.

FIG. 2 sets for a block diagram illustrating another example system 200 for preserving memory ordering between offloaded instructions and non-offloaded instructions according to various embodiments of the present disclosure. The example of FIG. 2 is similar to the example system of FIG. 1 in that the system 200 also includes a multicore processor 201 that is similar to the multicore processor 201 depicted in FIG. 1. The example system 200 is different from the example system 100 of FIG. 1 in that the multicore processor 201 uses a global ALB 260 in place of the per-core ALBs 160, 162, 164, 166. In some implementations, the global ALB 260 includes the ALB directory 170. In some examples, the global ALB 260 is implemented on the I/O die 150 and may be communicatively coupled to or integrated in the coherency synchronizer 136. In some implementations, the global ALB 260 includes a controller and an index of memory addresses targeted by offload requests, like per-core ALBs 160, 162, 164, 166. In these implementations, one entry for a memory address is recorded for all cores executing offload instructions in threads having the same process identifier. The global ALB 260 may be organized as a set-associative cache.

In some implementations, as each offload request is received at the coherency synchronizer (as previously discussed), the global ALB 260 is updated with an entry for the memory address accessed by the offload request. The global ALB 260 allocates an entry for each memory address accessed by offload requests originating from all of the cores, where the offload requests include the same process identifier. The entries include the memory address and a count of the number of threads that have sent an offload request that access the memory address. In some examples, the entry also includes the thread identifier and/or core identifier of an offload request that includes an access to the memory address. In response to receiving an offload request, the coherency synchronizer 136 initiates the appropriate cache probe operations as discussed above (e.g., sending probe requests by a probe filter to invalidate clean data and flush dirty data in cache entries for the memory address) and increments a counter in the entry corresponding to the memory address for each probe request transmitted. As probe responses from each thread/core arrive at the coherency synchronizer 136, the count in the corresponding entry of the global ALB 260 is decremented. Once probe responses from all threads accessing a memory address have arrived at the global ALB 260, the global ALB entry for that memory address can be cleared because its count will be set to 0. The global ALB 260 allows the sharing of memory address entries between threads of the same process (which can effectively reduce demands on global ALB 260 capacity). Each global ALB entry may also use the process identifier along with the memory address as the tag to differentiate traffic among processes.

In these implementations, the ALB directory 170 is updated as described above with respect to the per-core ALB implementations. When a core executes the barrier_start instruction, the ALB directory 170 is updated to indicate that the core is beginning to execute offload instructions. When a core executes the barrier_end instruction, the ALB directory 170 is updated to reflect that the core has completed the processing of all of the offload instructions in the offload transaction. When all cores executing the offload transaction in threads of a particular process have reached the barrier_end instruction, it is determined whether the global ALB 260 includes any remaining memory address entries for the process that have yet to clear. When all of the memory address entries for the process in the global ALB 260 have been cleared (i.e., a thread count of '0'), the controller of the ALB directory 170 transmits a signal to the cores to lift the semaphore blocking execution of younger non-offload instructions. Upon receiving this signal, the cores allow the barrier_end instruction to retire and execution of non-offload instructions to continue.

Consider an example where two cores 106, 110 are executing threads that include parallelized offload transaction of a process P. Once the cores 106, 110 have executed the barrier_start instruction, the barrier status vector in the ALB directory 170 is updated to reflect that cores 106, 110 are executing offload instructions for a process P identified by $P_{ID}$. In this example, a core 106 issues an offload request that includes memory address 0xFFFF as a memory operand (e.g., either a load or a store of the data in 0xFFFF). A global ALB table entry is initialized with index tag (e.g., memory address:$P_{ID}$) having a count of '1'. A probe request to invalidate and/or flush data in cache entries for 0xFFFF is sent by the coherency synchronizer 136. When core 110 issues an offload request that includes memory address 0xBFAF as a memory operand (e.g., either a load or a store of the data in 0xBFAF), the tag of that request (e.g., memory address:$P_{ID}$) hits the entry in the global ALB 260 and the count for the entry is incremented to '2'. A probe request to invalidate and/or flush data in cache entries for 0xBFAF is sent by the coherency synchronizer 136. As probe responses are received for each probe request, the count for the entry is decremented. When the count for the entry is '0', the entry may be cleared. When both cores 106, 110 have signaled the barrier_end instruction (i.e., where the cores 106, 110 are known to be the only two cores executing the offload transaction threads), the ALB directory 170 signals to the cores 106, 110 that the semaphore may be lifted and the barrier_end instructions may be retired, such that younger non-offload instructions may begin execution.

In alternative implementations, the global ALB 260 includes a controller and a table with counters for each thread of each process. Such implementations may have a smaller area footprint than storing memory addresses. A counter in the table is incremented whenever a probe request is sent to the caches by a coherency synchronizer 136 and/or probe filter. Upon receiving a probe response, the counter for the process thread is decremented. The coherency synchronizer 136 and/or probe filter uses the memory address in the probe response to identify a corresponding pending offload request queue entry and marks the offload request as ready to be dispatched to the memory controller 134. In response to a thread sending a barrier_end request, the global ALB 260 will wait for the counter of the thread from the same process to reach '0'. Once the counters of all threads of the same process reach '0' and a barrier_end request is received from all threads (as determined form the ALB directory 170, the global ALB 260 notifies all threads/cores to lift the barrier and resume execution of younger non-offload instructions.

In the per-core ALB implementation discussed above, there may be no need for the barrier_start and barrier_end instructions for a single-threaded application because, when the ALB contents are cleared then younger non-offload instructions can issue. There may be no need for barrier_start as there is only one thread per process. However, in the global ALB implementation, a fence instruction may be used to signal the ALB directory so that the ALB directory may signal the core to lift the semaphore when the global ALB has been cleared. That is, the barrier_end instruction is replaced by a fence_end instruction which has the same semantics as the barrier_end instruction except that it applies to the traffic of the only thread of the process, and where the processor system implements a global ALB.

Figure 3:
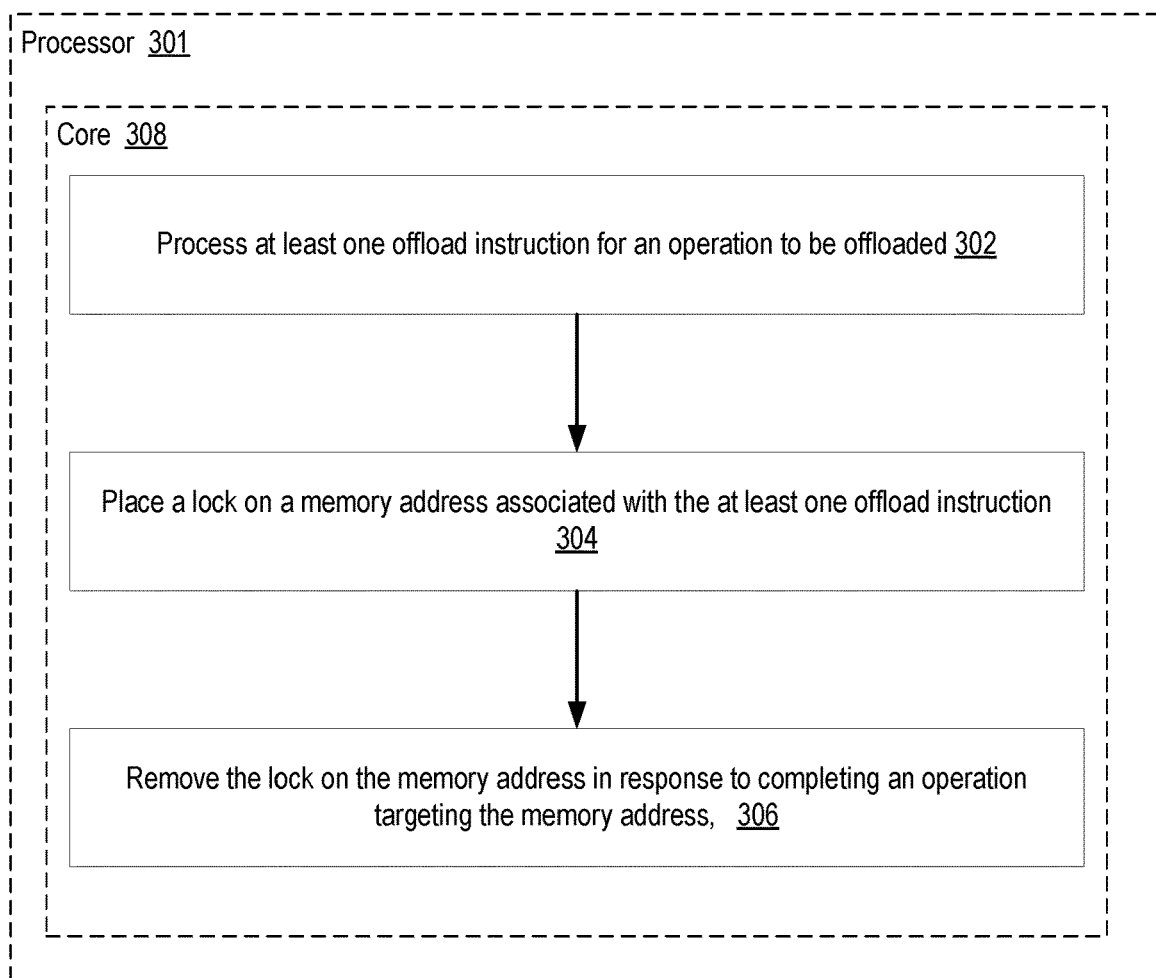
FIG. 3 sets forth a flow chart illustrating an example method of preserving memory ordering between offloaded instructions and non-offloaded instructions in accordance with embodiments of the present disclosure.

For further explanation, FIG. 3 sets forth a flow chart illustrating an exemplary method for preserving memory ordering between offloaded instructions and non-offloaded instructions according to embodiments of the present disclosure. The exemplary method of FIG. 3 includes processing 302 at least one offload instruction for an operation to be offloaded. In some examples, processing 302 at least one offload instruction for an operation to be offloaded is carried out by a core 308 receiving at least one offload instruction for an operation to be performed on an offload target device, such as an accelerator or a processing-in-memory (PIM) device. For example, the offload instruction (e.g., a remote_load or remote_store instruction) includes a memory operand representing a memory address in the offload target device and a register operand of the offload target device, where the offload target device executes an operation to read data at the memory address into the register or write data in the register to the memory address. In these examples, processing 302 at least one offload instruction for an operation to be offloaded is also carried out by the core 308 calculating a memory address from the memory operand and generating an offload request that may be processed by a memory controller to transmit commands to the offload target device, where the offload request includes the operation, register operand, and calculated memory address, and metadata/header information such as a process identifier, a thread identifier, and/or a core identifier. In some examples, the offload request may be special form of a write request with a flag to indicate that the request is an offload request. The core 308 may be any of the cores 106, 108, 110, 112 of a processor 301 such as processor 101 FIG. 1 and processor 201 in FIG. 2.

The method of FIG. 3 also includes placing 304 a lock on a memory address associated with the at least one offload instruction. The lock on a memory address represented in an operand of the at least one offload instruction prevents younger non-offload instructions executing on the core 308 from accessing data the core caches corresponding to the memory address as part of speculative execution. In some examples, placing 304 a lock on a memory address represented in an operand of the at least one offload instruction is carried out by storing the memory address calculated from the memory operand of the offload instruction in an ALB. For example, the ALB may be a per-core ALB 160, 162, 164, 166 as discussed above with respect to FIG. 1, or a global ALB 260 as discussed above with respect to FIG. 2. In other examples, placing 304 a lock on a memory address associated with the at least one offload instruction is carried out by otherwise indicating that a memory address is targeted by an offload instruction that is in-flight such that access to the memory address is blocked. The granularity of the locking is the same as the granularity of the offloaded computations or it can be a constant cache block granular locking. For example, the memory address may be included in a range of memory addresses upon which the lock is placed. In some examples, the lock is placed on the memory address associated with the at least one offload instruction after processing of the at least one offload instruction completes.

The method of FIG. 3 also includes removing 306 the lock on the memory address in response to completing an operation targeting the memory address. In some implementations, the core 308 forwards the generated offload request to a coherency synchronizer (e.g., the coherency synchronizer 136 of FIGS. 1 and 2). As discussed above, the coherency synchronizer identifies the memory address in the offload request and transmits cache probes to private caches of all cores in the processor system, where the cache probe targets cache entries for the memory address. The coherency synchronizer may include a probe filter to identify respective caches of each core and core complex that include cache entries for the memory address. In some examples, a cache operation may be completed by the coherency synchronizer when an invalidation probe request is transmitted. In other examples, a cache operation may be completed by the coherency synchronizer when a probe response to a flush probe request is received. In effect, the cache operation is complete when it can be guaranteed that any younger instruction will not access data in the cache for a memory address accessed by an offload instruction. When the coherency synchronizer completes the cache operation (i.e., initiating a probe request for all private caches of the cores), the coherency synchronizer signals to the controller of the ALB to unlock the memory address.

In some examples, removing 306 the lock on the memory address is carried out by receiving the unlock signal from the coherency synchronizer and, in response, unlocking the memory address to allow younger non-offload instructions to access the memory address (i.e., as the cache entries have been invalidated, these younger instructions must go to memory where the offload operations will have already completed). That is, the lock on the memory address is removed before the requested offload operations are performed by the offload target device and may even be removed before transmitting offload commands to the offload target device. Unlocking the memory address may be carried out by invalidating or clearing the entry for the memory address in the ALB. In some examples, clearing the ALB entry is carried out in the core that originated the offload request. In other examples, clearing the ALB entry is carried out in the global ALB.

Readers will appreciate that using an ALB to lock memory addresses of in-flight offload processing requests until cache entries for those addresses have been invalidated across all cores in the processor ensures that younger non-offload instructions will not access stale data in the caches by enforcing memory ordering between the offload instruction code sequences and younger non-offload instructions.

For further explanation, FIG. 4 sets forth a flow chart illustrating another exemplary method for preserving memory ordering between offloaded instructions and non-offloaded instructions according to embodiments of the present disclosure. Like the exemplary method of FIG. 3, the method of FIG. 4 also includes processing 302 at least one offload instruction for an operation to be offloaded; placing 304 a lock on a memory address represented in an operand of the at least one offload instruction; and removing 306 the lock on the memory address in response to completing a cache operation targeting the memory address.

The exemplary method of FIG. 4 also includes determining 402 that a plurality of processor cores have each begun executing a sequence of offload instructions, wherein the sequence of offload instructions executing among the plurality of processor cores share the same process identifier. In some examples, determining 402 that a plurality of processor cores have each begun executing a sequence of offload instructions, wherein the sequence of offload instructions executing among the plurality of processor cores share the same process identifier, is carried out by a multicore processor 301 determining that two or more cores 308, 410 are about to begin processing an offload transaction in respective threads of an application hosted on cores 308, 410 multicore processor 301. Each thread executing the offload transactions includes the same process identifier of the application. In some examples, the offload transactions include a special instruction that marks the beginning of a sequence of offload instructions. In these examples, each core 308, 410 may signal when they have reached this instruction or marker. In some implementations, determining 402 that a plurality of processor cores have each begun executing a sequence of offload instructions is carried out by a controller of an ALB directory (e.g., the ALB directory 170) that receives the signals from the cores 308, 410 indicating that they have begun processing offload instructions.

The method of FIG. 4 also includes restricting 404 the execution of non-offload instructions that are younger than any of the offload instructions. In some examples, restricting 404 the execution of non-offload instructions that are younger than any of the offload instructions is carried out by each core 308, 410, prior to executing the offload instructions, instituting a semaphore that blocks execution of instructions in that thread that are younger than any offload instruction in the offload transaction on that core.

The method of FIG. 4 also includes in response to determining that each processor core has completed executing its sequence of offload instructions, removing 406 the restriction. In some examples, when each core 308, 410 retires the last offload instruction of its offload transaction, the core may signal that the offload transaction has completed in that core. In these examples, removing 406 the restriction is carried out by releasing the semaphore on each core 308, 410 to allow younger non-offload instruction in those threads to begin execution. In some implementations, removing 406 the restriction is carried out by the controller of the ALB directory receiving signals from all cores 308, 410 processing the offload transactions that the transactions have completed and signaling to those cores to release the semaphore only after all of the cores 308, 410 have signaled completion. In this way, memory ordering between offload instructions code sequences and younger non-offload instruction code is preserved by forcing all younger non-offload instructions on each core to wait until all core threads have finished processing their respective offload transactions.

For further explanation, FIG. 5 sets forth a flow chart illustrating another exemplary method for preserving memory ordering between offloaded instructions and non-offloaded instructions according to embodiments of the present disclosure. Like the exemplary method of FIG. 4, the method of FIG. 5 also includes determining 402 that a plurality of processor cores have each begun executing a sequence of offload instructions, wherein the sequence of offload instructions executing among the plurality of processor cores share the same process identifier; restricting 404 the execution of non-offload instructions that are younger than any of the offload instructions; processing 302 at least one offload instruction for an operation to be remotely executed on a remote device; placing 304 a lock on a memory address represented in an operand of the at least one offload instruction, in response to completing a cache operation targeting the memory address; removing 306 the lock on the memory address; and, in response to determining that each processor core has completed executing its sequence of offload instructions, removing 406 the restriction.

In the method of FIG. 5, determining 402 that a plurality of processor cores have each begun executing a sequence of offload instructions, wherein the sequence of offload instructions executing among the plurality of processor cores share the same process identifier includes determining 502 that each core has executed a start barrier instruction in the respective sequences of offload instructions. In some examples, each offload transaction begins with a start barrier instruction (e.g., barrier_start). In these examples, when each core 308, 410 executes the start barrier instruction, the core signals that the start barrier instruction has been executed and institutes the semaphore to block younger non-offload instructions on the core from executing. A monitoring controller (e.g., a controller of the ALB directory 170) receives the signals from the cores 308, 410 indicating that these cores are ready to begin processing offload instructions. In response to receiving the signals indicating these cores are executing threads of the same process identifier and will begin processing the offload instructions, the monitoring controller may record this information in a status record (e.g., the barrier status vector discussed above). After it is known from the execution of the start barrier instruction which cores will be executing threads with the offload transactions, the progress of those threads may be monitored while each core blocks the execution of younger non-offload instructions for the respective threads.

For further explanation, FIG. 6 sets forth a flow chart illustrating another exemplary method for preserving memory ordering between offloaded instructions and non-offloaded instructions according to embodiments of the present disclosure. Like the exemplary method of FIG. 4, the method of FIG. 6 also includes determining 402 that a plurality of processor cores have each begun executing a sequence of offload instructions, wherein the sequence of offload instructions executing among the plurality of processor cores share the same process identifier; restricting 404 the execution of non-offload instructions that are younger than any of the offload instructions; processing 302 at least one offload instruction for an operation to be remotely executed on a remote device; placing 304 a lock on a memory address represented in an operand of the at least one offload instruction, in response to completing a cache operation targeting the memory address; removing 306 the lock on the memory address; and, in response to determining that each processor core has completed executing its sequence of offload instructions, removing 406 the restriction.

In the method of FIG. 6, removing 406 the restriction in response to determining that each processor core has completed executing its sequence of offload instructions includes determining 602 that an end barrier instruction has been executed on each core. In some examples, determining 602 that an end barrier instruction has been executed on each core is carried out by the cores 308, 410 executing the end barrier instruction (e.g., the barrier_end discussed above) of their respective sequence of offload instructions including signaling to the monitoring controller (e.g., the ALB directory 170 of FIGS. 1 and 2) that the end barrier instruction has been encountered. For example, the cores 308, 410 may transmit a message to the ALB directory indicating the end barrier instruction and including the process identifier of the thread executing on the core. In these examples, the end barrier instruction cannot retire until the monitoring controller signal the release of the semaphore blocking execution of younger non-offload instructions. Once all cores 308, 410 have executed the end barrier instruction, the monitoring controller signals the release of the semaphore to all cores 308, 410.

For further explanation, FIG. 7 sets forth a flow chart illustrating another exemplary method for preserving memory ordering between offloaded instructions and non-offloaded instructions according to embodiments of the present disclosure. Like the exemplary method of FIG. 6, the method of FIG. 7 also includes determining 402 that a plurality of processor cores have each begun executing a sequence of offload instructions, wherein the sequence of offload instructions executing among the plurality of processor cores share the same process identifier, including determining 602 that an end barrier instruction has been executed on each core; restricting 404 the execution of non-offload instructions that are younger than any of the offload instructions; processing 302 at least one offload instruction for an operation to be remotely executed on a remote device; placing 304 a lock on a memory address represented in an operand of the at least one offload instruction, in response to completing a cache operation targeting the memory address; removing 306 the lock on the memory address; and, in response to determining that each processor core has completed executing its sequence of offload instructions, removing 406 the restriction.

In the method of FIG. 7, removing 406 the restriction includes determining 702 that all memory address locks triggered by the sequence of offload instructions have been removed. In some examples, determining 702 that all memory address locks triggered by the sequence of offload instructions have been removed is carried out by determining the ALB of each core 308, 410 is empty, as discussed above with respect to the per-core ALB s 160, 162, 164, 166 in FIG. 1. In these examples, the cores 308, 410 signal to the monitoring controller (e.g., a controller of the ALB directory 170 that their ALB is empty. This information may be transmitted as part of executing the end barrier instruction or as a separate signal. In other examples, determining 702 that all memory address locks triggered by the sequence of offload instructions have been removed is carried out by determining the global ALB of each core 308, 410 is empty, as discussed above with respect to the global ALB 260 in FIG. 2.

For further explanation, FIG. 8 sets forth a flow chart illustrating another exemplary method for preserving memory ordering between offloaded instructions and non-offloaded instructions according to embodiments of the present disclosure. Like the exemplary method of FIG. 6, the method of FIG. 8 also includes determining 402 that a plurality of processor cores have each begun executing a sequence of offload instructions, wherein the sequence of offload instructions executing among the plurality of processor cores share the same process identifier, including determining 602 that an end barrier instruction has been executed on each core; restricting 404 the execution of non-offload instructions that are younger than any of the offload instructions; processing 302 at least one offload instruction for an operation to be remotely executed on a remote device; placing 304 a lock on a memory address represented in an operand of the at least one offload instruction, in response to completing a cache operation targeting the memory address; removing 306 the lock on the memory address; and, in response to determining that each processor core has completed executing its sequence of offload instructions, removing 406 the restriction.

In the example method of FIG. 8, removing 406 the restriction includes tracking 802 the progress of each core in a status buffer communicatively coupled to each core. In some examples, tracking 802 the progress of each core in a status buffer communicatively coupled to each core includes recording a process identifier and an indication of cores that have executed the start barrier and end barrier instructions. For example, the status buffer may be the barrier status vector discussed above, where a bit in the barrier status vector represents each core in the processor system, and where the bit is set when the start barrier instruction is executed and cleared after the end barrier instruction is encountered. In these examples, each core 308, 410 notifies the monitoring controller (e.g., the controller of the ALB directory 170) that the core when the start barrier instruction and end barrier instruction have been executed.

In view of the above description, readers will appreciate the embodiments in accordance with the present disclosure provide numerous advantages. The reader will appreciate that these embodiments ensure correct memory ordering between offload instructions and younger non-offload instructions. Readers will also appreciate that the implementations of the start barrier and end barrier instructions allows younger non-offload instructions to access memory sooner compared to conventional barrier or fence instructions, thereby resulting in higher performance. That is, unlike conventional barrier or fence solutions, embodiments here do not wait for the offload target device (e.g., PIM device) to finish executing the offloaded operations before lifting the barrier. Readers will also appreciate that structures introduced here, including the ALB and ALB directory, provide hardware support for implementing memory ordering and barrier enforcement.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of preserving memory ordering between offloaded instructions and non-offloaded instructions, the method comprising:
    executing, on a plurality of processor cores, a respective sequence of processing-in-memory (PIM) offload instructions that includes a start barrier instruction and an end barrier instruction;
    restricting, in the plurality of processor cores, execution of non-offload instructions that are younger than any of the PIM offload instructions based on each of the plurality of processor cores executing the start barrier instruction; and
    removing the restriction based on determining that all of the plurality of processor cores have executed the end barrier instruction in the respective sequence of PIM offload instructions.

2. The method of claim 1 further comprising identifying that the plurality of processor cores have each begun executing the respective sequence of PIM offload instructions by determining that the plurality of processor cores have each executed the start barrier instruction in the respective sequences of PIM offload instructions.

3. The method of claim 1, wherein the start barrier instruction indicates a number of processor cores that are co-executing the respective sequence of PIM offload instructions.

4. The method of claim 1 further comprising determining that each of plurality of processor cores has completed the respective sequence of PIM offload instructions by determining that the end barrier instruction in each respective sequence has been executed on each core.

5. The method of claim 4, wherein determining that each of plurality of processor cores has completed the respective sequence of PIM offload instructions includes determining that respective address lock buffers of the plurality of processor cores are empty.

6. The method of claim 1 further comprising tracking a progress of the execution of the respective sequence of PIM offload instructions in each core.

7. The method of claim 1, wherein each PIM offload instruction is for an operation to be offloaded to a processing-in-memory (PIM) device.

8. The method of claim 1, wherein the plurality of processor cores execute the respective sequences of PIM offload instructions in parallel.

9. The method of claim 3, wherein the start barrier instruction identifies a location that stores the number of processor cores that are co-executing the respective sequence of PIM offload instructions.

10. A multicore processor configured to:
    execute, on a plurality of processor cores, a respective sequence of processing-in-memory (PIM) offload instructions that includes a start barrier instruction and an end barrier instruction;
    restrict, in the plurality of processor cores, execution of non-offload instructions that are younger than any of the PIM offload instructions based on each of the plurality of processor cores executing the start barrier instruction; and
    remove the restriction based on determining that all of the plurality of processor cores of have executed the end barrier instruction in the respective sequence of PIM offload instructions.

11. The processor of claim 10, wherein the processor is further configured to identify that the plurality of processor cores have each begun executing the respective sequence of PIM offload instructions by determining that each processor core has executed the start barrier instruction in the respective sequences of PIM offload instructions.

12. A system comprising:
    a processing-in-memory (PIM) device; and
    a multicore processor coupled to the PIM device, the processor configured to:
        execute, on a plurality of processor cores, a respective sequence of PIM offload instructions that includes a start barrier instruction and an end barrier instruction;
        restrict, in the plurality of processor cores, execution of non-offload instructions that are younger than any of the PIM offload instructions based on each of the plurality of processor cores executing the start barrier instruction; and
        remove the restriction based on determining that all of the plurality of processor cores of have executed the end barrier instruction in the respective sequence of PIM offload instructions.

13. The system of claim 12, wherein the processor is further configured to identify that the plurality of processor cores have each begun executing the respective sequence of PIM offload instructions by determining that each core has executed the start barrier instruction in the respective sequences of PIM offload instructions.

14. The system of claim 12, wherein the start barrier instruction indicates a number of processor cores that are co-executing the respective sequence of PIM offload instructions.

15. The system of claim 12, wherein the processor is configured to determine that each of plurality of processor cores has completed the respective sequence of PIM offload instructions by determining that an end barrier instruction in each respective sequence has been executed on each core.

16. The system of claim 12, wherein determining that each of plurality of processor cores has completed the respective sequence of PIM offload instructions includes determining that all memory address locks triggered by the sequence of PIM offload instructions have been removed by determining that respective address lock buffers of the plurality of processor cores are empty.

17. The system of claim 12, wherein the processor is further configured to track a progress of the execution of the respective sequence of PIM offload instructions in each core.

18. The system of claim 12, wherein each core is configured to:
    process at least one PIM offload instruction;
    place a lock on a memory address associated with the at least one PIM offload instruction; and
    remove the lock on the memory address in response to completing an operation targeting the memory address.

19. The processor of claim 10, wherein the start barrier instruction indicates a number of processor cores that are co-executing the respective sequence of PIM offload instructions.

20. The processor of claim 10, wherein the processor is configured to determine that each of plurality of processor cores has completed the respective sequence of PIM offload instructions by determining that the end barrier instruction has been executed on each core.

* * * * *